United States Patent
Suter

(10) Patent No.: US 7,890,377 B2
(45) Date of Patent: Feb. 15, 2011

(54) METHOD FOR PRODUCING AN ORDER AND ORDERING APPARATUS

(75) Inventor: Ruedi Suter, Zürich (CH)

(73) Assignee: Phonak AG, Stafa (CH)

( * ) Notice: Subject to any disclaimer, the term of this patent is extended or adjusted under 35 U.S.C. 154(b) by 1366 days.

(21) Appl. No.: 11/263,416

(22) Filed: Oct. 31, 2005

(65) Prior Publication Data
US 2007/0098193 A1     May 3, 2007

(51) Int. Cl.
*G06Q 30/00*     (2006.01)
(52) U.S. Cl. ......................................................... 705/26
(58) Field of Classification Search .................... 705/26, 705/27
See application file for complete search history.

(56) References Cited
U.S. PATENT DOCUMENTS

| | | | |
|---|---|---|---|
| 2002/0146137 A1* | 10/2002 | Kuhnel et al. ................. | 381/60 |
| 2003/0103070 A1* | 6/2003 | Tiongson et al. ............ | 345/700 |
| 2003/0208365 A1 | 11/2003 | Avery et al. | |
| 2004/0122691 A1 | 6/2004 | Lupp et al. | |
| 2005/0086210 A1* | 4/2005 | Kita et al. ...................... | 707/3 |
| 2007/0016488 A1* | 1/2007 | Ulenas ........................ | 705/26 |
| 2008/0275793 A1* | 11/2008 | Hathaway et al. ............. | 705/27 |

FOREIGN PATENT DOCUMENTS

GB     2404464     2/2005

* cited by examiner

*Primary Examiner*—Mila Airapetian
(74) *Attorney, Agent, or Firm*—Pearne & Gordon LLP

(57) ABSTRACT

A hearing device to be ordered in identified by a set (2) of data elements. Identifying data sets K[E] according to previous orders are stored (5) to such ordered data sets (K[E]) weighing values are assigned to (W[K]) which reflect the frequency of ordering hearing devices with respective data. The data set (2) of an intended order is compare with data sets of previous orders (K[E]) on the bases of a pre-established similarity criterion ($\#_E$). Similar data sets of previous orders are ranked according to the assigned weighing values (W[K]) and dispatched. The stored ordering data sets (K[E]) and the assigned weighing values (W[K]) are updated by an order for a hearing device which is placed.

8 Claims, 1 Drawing Sheet

METHOD FOR PRODUCING AN ORDER AND ORDERING APPARATUS

BACKGROUND OF THE INVENTION

The present invention departs from needs which are encountered when ordering hearing aid devices. Nevertheless the solution according to the present invention may be applied more generically to hearing devices which include in the ear hearing devices, completely in the channel hearing devices, outside the ear hearing devices, monaural or binaural hearing devices and thereby such devices for therapeutical purposes, i.e. hearing aid devices or hearing devices rather for improving standard hearing in specific situations as e.g. hearing protection devices for acoustically noisy environment.

With an eye on hearing aid devices wherefrom the present invention departs, it is customary that an ordering instance as e.g. an audiologist places an order for an individual's hearing device by specifying a rather complex set of data with data elements, which set defines the hearing device intended to be ordered. Thereby the ordering instance, according to its experience, is not aware that most frequently some of the combinations of the addressed data elements are preferred in hearing aid ordering and some combinations have never been or are most rarely ordered.

SUMMARY OF THE INVENTION

The present invention therefore departs from the object to provide an ordering instance with ordering history information and thus preference information for hearing devices.

This object is resolved by a method for producing an order for a hearing device which comprises defining the hearing device as intended to be ordered by an intended combination of a multitude of data elements. There is automatically provided and stored information which comprises all or at least a predominant part of possible combinations of data elements which define a hearing device. Assigned to each of these combinations, there is further provided and stored a respective weighing value which depends on the frequency with which a hearing device has previously been ordered with the respectively assigned combination of data elements. The intended combination of data elements is automatically compared with the stored combinations thereby selecting those stored combinations which agree with the intended combination at least by a predetermined number of data elements. Subsequently the selected combinations are grouped in an order which depends on the weighing values assigned to the selected combinations. The selected combinations as grouped are dispatched. The hearing device is ordered with a combination of data elements in dependency of the dispatched combinations. The ordered combination updates the information comprising the at least predominant part of possible combinations of data elements and their respective weighting values.

Thereby the ordering instance is provided automatically and in dependency of the intended order with information of ordering history for at least similar hearing devices.

In one embodiment of the method according to the present invention the addressed data elements include data elements which define for the input/output transfer behaviour of the hearing device, i.e. technical data defining signal processing in the hearing device. In a further embodiment of the method according to the present invention, the addressed values do not only reflect frequency of previous orderings but additionally reflect manufacturing preferences.

Thus it might be that some combinations of elements may in fact be realised by the manufacturing process but e.g. resulting in a hearing device which is customary considered too expensive. Such a fact may be reflected by lowering the respective weight value assigned to such combination.

In a further embodiment at least one of automatically providing and storing information and of automatically comparing and grouping selected combination is performed remote from defining the hearing device intended to be ordered and from dispatching selected and proposed combinations.

Under a further aspect of the present invention, there is provided an ordering apparatus which comprises a table storage unit, a calculator unit, a comparing and selecting unit and at least one man/apparatus—as well as apparatus/man interface. The man/apparatus interface is operationally connected to one input of the comparing unit, a second input thereof being operationally connected to an output of the table storage unit. An output of the comparing unit is operationally connected to the apparatus/man interface. An input of the calculator unit is operationally connected to one of the at least one man/machine interface whereby an output of the calculator unit is operationally connected to an updating input of the table storage unit.

In an embodiment of the apparatus according to the present invention, the table storage stores first data and, assigned thereto, second data. The comparing unit performs in one comparing cycle a comparison of data applied to the first input of the comparing unit with all the first data of the table storage and as applied to the second input of the comparing unit.

In a further embodiment the comparing unit outputs first data which accord with data applied to the first input of the comparing unit with respect to a predetermined criteria.

In a further embodiment the apparatus comprises a ranking unit which is interconnected between the output of the comparing unit and the input of the apparatus/man interface. The ranking unit generates data at an output which comprises the first data output from the comparing unit ranked by the second data assigned thereto.

BRIEF DESCRIPTION OF THE DRAWING

The invention shall now be exemplified by means of a figure and its description. The figure shows a simplified schematical functional block/signal-flow diagram of a system including the apparatus according to the present invention and operating the method according to the invention.

In the figure there is shown, by means of a simplified schematic signal-flow/functional-block diagram, a system according to the present invention and operating according to the manufacturing method of the invention.

BRIEF DESCRIPTION OF THE DRAWING

Figure 1:
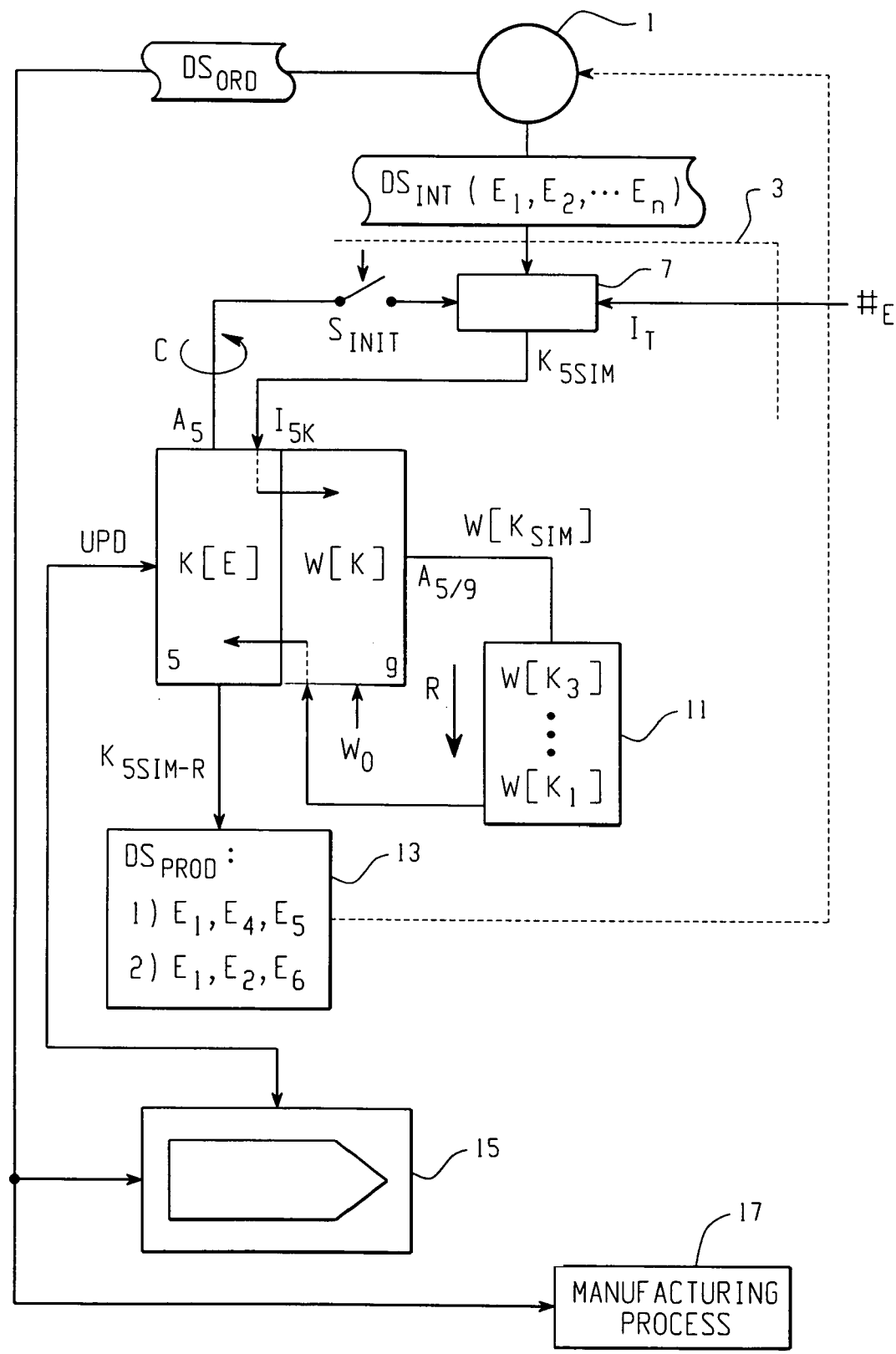

An ordering instance 1 initiates an order for a hearing device by inputting a set 2 of data $DS_{INT}$ into a man/machine interface, as by a keyboard (not shown), to an advising computer or computer network generally shown at 3. The set 2 of data $DS_{INT}$ identifies and specifies the hearing device which is intended to be ordered and which has been evaluated on the bases of needs of an individual for which the hearing device is intended.

The set 2 of data comprises a number of data elements denoted in FIG. 1 by $E_1, E_2, E_3 \ldots E_n$. Such data elements may e.g. define for: type of hearing device, shape, color, especially for audiologic/technical features as generically for input/output transfer behaviour of the device. Initiated by entering the set 2 of data $DS_{INT}$ to the advising computer 3 or network and as schematically shown by closing switch $S_{INT}$, the output A5 of an element-combination-storage unit 5 is operationally connected to one input of a comparing unit 7. In element-combination-storage unit 5 all or at least a predominant part of combinations K[E] of elements E possible to be applied to the data set 2, $DS_{INT}$, are stored, which meaningfully define a hearing device.

In comparing unit 7, the prevailing elements $E_1 \ldots E_n$ of the set 2 of data $DS_{INT}$ as input, are compared with all the stored combinations K of elements E, K[E], as schematically shown by circulating arrow C. At a threshold input $I_T$ Of comparator unit 7 a threshold value is input defining a number of elements $\#_E$. This number, a positive integer, defines the number of elements which are at least to be equal in $DS_{INT}$ and in element combinations K[E] from storage 5. Combinations K[E] in which at least the number #E of elements coincides with elements in $DS_{INT}$, are output from comparing unit 7, called similar (or equal) combinations $K_{SSIM}$. Thus each combination $K_{SSIM}$ represents a set of data to elements E, wherefrom at least the number #E of elements is equal with elements of $DS_{INT}$. Which of the elements coincide is not considered in this example, although some elements might be given more importance, e.g. by assigning to coinciding specific elements in $DS_{INT}$ and in K[E] a weight of more than one coincidences.

Once the combinations $K_{SSIM}$ M are established at the output of unit 7, these combinations $K_{SSIM}$ are fed back to the element-combination-storage 5.

Element-combination-storage 5 cooperates with a weight-storage unit 9. In weight-storage unit 9 to each combination of elements K[E] a value W[K] is assigned and stored. A value $W[K_x]$ is dependent on the probability with which the assigned element combinations $K_x[E]$ has occurred for hearing devices which were ordered and manufactured during a predetermined previous time span.

When the element combinations $K_{SSIM}$ are applied as schematically shown to input $I_{SK}$ of the element-combination-storage 5, the respectively assigned weight values W[K] are output at $A_{5/9}$ as $W[K_{SSIM}]$. The weight values $W[K_{SSIM}]$ are ranked in a ranking unit 11 e.g. starting with the highest value as schematically shown at R. The values $W[K_3] \ldots W[K_1]$ as exemplified to have been ranked in ranking unit 11 are fed back to element-combination-storage 5 to initiate the assigned elements combinations $K_{SSIM-R}$, now in proper ranking order, to be output to a machine/man interface e.g. to a computer display 13. Thus at the display 13 there appear data sets $DS_{PROP}$ which are similar to the data set $DS_{INT}$ as input by the ordering instance 1 and which data sets $DS_{PROP}$ have been found to be highest weighted. As the weighting values W comprise and are established based on frequency of recurring of orders with the assigned element-combination, the ordering instance receives information which kind of similar hearing devices have been customary ordered up to now. The ordering instance now decides whether the intended order according to $DS_{INT}$ shall be amended to reflect a hearing device as defined by a proposed element combination as of $DS_{PROP}$. Once such initial ordering set of data has been amended it is re-input as $DS_{INT}$ to start a new proposing cycle as was described or it may be applied as a definite order data set 4, $DS_{ORD}$.

Once the ordering instance 1 has decided how the hearing device to be ordered shall definitively be conceived the ordering data set $DS_{ORD}$ is established and entered to the system as by the addressed man/machine interface (not shown). The data set as ordered, $DS_{ORD}$, is fed to a calculator unit 15 by which the data in element-combination-storage 5 and in weight storage 9, commonly defining for a table K[E]/W [K] is updated, Upd. To do so the data of the storages 5, 9 is read by calculator unit 15 updated and rewritten to the respective units 5, 9.

The data set as ordered defines the hearing device to be delivered and thereby may directly control the manufacturing process 17.

Elements E defining for a hearing device may be constructional parameters e.g. as in the ear-, completely in the channel-, outside the ear-device defining elements, shell geometry, shell materials, specific signal processing parameters, power supply units, DSP's, microphones etc. but may also be diagnostic data as received from an audiologist.

We have addressed the weighting-values W being dependent from the frequency of recurrence of the assigned combination of elements having been ordered by data sets $DS_{ORD}$. Additionally to the addressed frequency of recurrence other criteria may be applied for establishing the weighting values W. As addressed in FIG. 1 by input $W_O$ the weighting values assigned to respective element combinations K[E] may include e.g. considerations of manufacturing preferences and may be appropriately adjusted independently from frequency of recurring.

The overall system as shown in the figure may be construed centralized at one location with the exception of manufacturing 17 so e.g. at the location of an ordering instance. Alternatively different functional blocks or units of the system may be located mutually remote e.g. as parts of a communication network. Clearly in most cases the display 13 will be placed at the location of the ordering instance. The element-combination-storage and weight storage 5/9 may be located as addressed at the location of the ordering instance or at the location of the manufacturer. The same is valid for the comparing unit 7 whereby the ranking unit 11 is preferably located there where the element combination/weighting storage 5/9 is located. Also the storages 5 and 9 may be mutually remote.

By the system and method as has been explained in context with the figure the ordering instance may e.g. just enter as many elements as it feels absolutely necessary for defining a hearing device to be ordered. Due to the subsequent evaluation there will be displayed in a ranked order similar complete data sets, as an amendment or proposal or a proposal for completing the orders.

The invention claimed is:

1. A method for producing an order for a hearing device by an ordering apparatus having a table storage unit and a comparing and selecting unit, comprising:
   defining a hearing device as intended to be ordered by an intended combination of a multitude of data elements;
   automatically providing and storing information in said table storage unit, comprising at least a predominant part of possible combinations of data elements defining a hearing device and, assigned to such combinations, respective weighting values depending on the frequency with which a hearing device has been previously ordered with the respectively assigned combination;
   automatically comparing, by said comparing and selecting unit, said intended combination with said stored combinations thereby selecting stored combinations which agree with said intended combination by at least a predetermined number of data elements;
   grouping said selected combinations in an order dependent on said weighting values of said selected combinations;
   dispatching said selected combinations grouped;

defining the hearing device to be ordered by producing an order with an order combination of data elements in dependency of said dispatched combinations; and updating said information by the occurrence of said order with said order combination.

2. The method of claim 1 wherein said data elements include data elements defining input/output transfer behaviour of a hearing device.

3. The method of claim 1 or 2 wherein said values are dependent on manufacturing preferences.

4. The method of claim 1 wherein at least one of automatically providing and storing information and of automatically comparing and of grouping said selected combination is performed remote from said defining a hearing device and from said dispatching said selected combinations.

5. An ordering apparatus comprising a table storage unit, a calculator unit, a comparing and selecting unit, at least one man/apparatus interface and at least one apparatus/man interface, said man/apparatus interface being operationally connected to one input of said comparing unit, a second input thereof being operationally connected to an output of said table storage unit, an output of said comparing unit being operationally connected to said apparatus/man interface; an input of said calculator unit being operationally connected to one of said at least one man/apparatus interface, an output of said calculator unit being operationally connected to an updating input of said table storage unit, said apparatus being adapted for producing an order for a hearing device, wherein the apparatus is adapted for producing the order for the hearing device according to steps comprising:

defining a hearing device as intended to be ordered by an intended combination of a multitude of data elements entered via said man/apparatus interface;

automatically providing and storing information in the table storage unit, comprising at least a predominant part of possible combinations of data elements defining a hearing device and, assigned to such combinations, respective weighting values depending on the frequency with which a hearing device has been previously ordered with the respectively assigned combination;

the comparing and selecting unit automatically comparing said intended combination with said stored combinations thereby selecting stored combinations which agree with said intended combination by at least a predetermined number of data elements;

grouping said selected combinations in an order dependent on said weighting values of said selected combinations;

dispatching said selected combinations grouped;

defining the hearing device to be ordered by producing an order with an order combination of data elements in dependency of said dispatched combinations; and updating said information by the occurrence of said order with said order combination.

6. The apparatus of claim 5 wherein said table storage unit stores first data and, assigned thereto, second data and said comparing unit performs in one comparing cycle a comparison of data applied to said first input with all said first data applied to said second input.

7. The apparatus of claim 6 wherein said comparing unit outputs first data, which accord with data applied to said first input according to a predetermined criteria.

8. The apparatus of claim 6 further comprising a ranking unit interconnected between said output of said comparing unit and said input of said apparatus/man interface said ranking unit generating data at an output comprising said first data output from said comparing unit ranked by said second data assigned thereto.

* * * * *

UNITED STATES PATENT AND TRADEMARK OFFICE
CERTIFICATE OF CORRECTION

| | | |
|---|---|---|
| PATENT NO. | : 7,890,377 B2 | Page 1 of 1 |
| APPLICATION NO. | : 11/263416 | |
| DATED | : February 15, 2011 | |
| INVENTOR(S) | : Ruedi Suter | |

It is certified that error appears in the above-identified patent and that said Letters Patent is hereby corrected as shown below:

In the specification, column 3, line 12, change "Of" to -- of --

In the specification, column 3, line 17, change "#E" to -- $\#_E$ --

In the specification, column 3, line 21, change "#E" to -- $\#_E$ --

In the specification, column 3, line 27, remove the -- M -- between "$K_{5SIM}$" and "are"

Signed and Sealed this

Seventeenth Day of May, 2011

David J. Kappos
*Director of the United States Patent and Trademark Office*